3,074,888
HIGH DENSITY FERRITES
Ralph E. Carter, Niskayuna, N.Y., assignor to General Electric Company, a corporation of New York
No Drawing. Filed Dec. 9, 1957, Ser. No. 701,301
2 Claims. (Cl. 252—62.5)

This invention relates to ceramic bodies having ferrimagnetic properties which contain substantial amounts of iron oxide and are known as "ferrites," and more particularly to a method for fabricating such bodies which have near theoretical density and hence improved magnetic properties.

As is well known, ferrite bodies have a wide variety of uses in electrical and electronic apparatus. Conventional ferrite ceramic bodies, however, have never exhibited structure sensitive magnetic properties as high as the theoretical values predicted for them, based on the study of small single crystal bodies prepared under laboratory conditions, at least in part because the polycrystalline bodies prepared by conventional ceramic forming and firing treatments have been porous. Stated otherwise, these conventional ferrite bodies have been found to contain a great number of very small voids and obviously, the smaller the volume of voids for a given gross volume of ceramic, the more nearly the magnetic properties approach the single crystal values. It would therefore be desirable to eliminate this porosity in such ferrite bodies and thereby improve their magnetic properties.

It is, therefore, a principal object of my invention to provide a method for fabricating polycrystalline ferrite ceramic bodies whereby the usual porosity thereof is reduced and the density of the bodies approaches the density of single crystal bodies. Other and specifically different object of my invention will become apparent from the detailed disclosure which follows.

Briefly stated and in accordance with one embodiment of my invention, I have discovered that if such ceramic bodies comprising a porous, single phase ferrite component are heat treated in a reducing atmosphere to cause partial reduction of the ferrite phase to form two phases, and subsequently heat treated in an oxidizing atmosphere to cause the reduced phase to reoxidize, the resulting polycrystalline single phase ferrite is substantially free of porosity.

More particularly, my invention relates to the fabrication of polycrystalline bodies composed substantially entirely of the so-called "cubic" ferrites or of such bodies in which the ferrimagnetic constituent thereof is such a ferrite. These well known materials include, for example, ferrites such as $MgFe_2O_4$ (sometimes expressed as $MgO.Fe_2O_3$), $MnFe_2O_4$, $ZnFe_2O_4$, $CdFe_2O_4$, $CuFe_2O_4$, $NiFe_2O_4$, $CoFe_2O_4$, and solid solutions of two or more of such ferrites. Conventionally ferrite ceramic bodies of such materials have been fabricated by mixing the appropriate formulation of oxide powders, firing the mixed powders to form the ferrite composition, grinding the ferrite, pressing or otherwise forming the ground ferrite into a body of the desired configuration, and sintering to form the final body. Since it has been known that reduction or partial reduction of the ferrite constituent of these bodies substantially reduces or destroys the magnetic properties of the final body, considerable pains are taken to insure that such reduction is minimized by the provision of oxidizing atmospheres during the conventional fabrication procedure. Usually, the properties desired in such bodies are a low coercive force and high permeability, both of which are deleteriously effected by partial reduction of the ferrite phase and by porosity.

I have discovered that the porosity of such bodies may be significantly reduced and the magnetic properties coincidentally improved by sintering the formed ferrite bodies in a reducing atmosphere whereby a substantial portion of the ferrimagnetic ferrite phase is partially reduced to form a non-magnetic second phase. According to my invention the sintered body is then subjected to an oxidizing heat treatment which reoxidizes the second phase portion back to the initial ferrite composition. Bodies treated in this manner are found to have significantly improved density and significantly improved magnetic properties compared to bodies having the same composition prepared according to conventional procedures.

As a specific working example representative of my invention, 947.6 grams of high purity $MgCO_3$ (equivalent to about 403.2 grams MgO) and 1605 grams of high purity, "pigment-grade" $Fe_2O_3$ (equivalent to about 1597 grams of pure $Fe_2O_3$) were mixed in a vehicle of 95 percent pure ethyl alcohol for about 10 minutes in a conventional colloid mill. The resulting mixture was dried to form a "cake" which was then ignited in an air atmosphere for 10 hours at 1050° C. During this ignition treatment the $MgCO_3$ was decomposed to from MgO which combined with the $Fe_2O_3$ to form magnesium ferrite, $MgF_2O_4$.

The resulting magnesium ferrite was then ground in 95 percent ethyl alcohol to a particle size which passed a 200 mesh screen and the alchol-ferrite slurry dried to form a "cake" which was then passed through a 30 mesh screen. This dry powder was then pressed under about 5000 p.s.i. pressure into bars measuring 1/4" by 1/4" by 1 1/4" and into toroids measuring 7/8" outside diameter, 9/16" inside diameter by 5/32" thick. It will be obvious that other forming procedures such as extrusion, for example, may be employed. These pressed bodies were then fired in a $CO_2$ atmosphere at 1450° C. for from 12 to 15 hours to form sintered coherent bodies which under microscopic examination were found to be relatively free of porosity and composed of two phases. These bodies were found to be composed of a polycrystalline matrix of $MgFe_2O_4$ and a dispersed second phase which was found to be a non-magnetic solid solution of MgO and FeO in a 1:2 molar ratio located principally at the grain boundaries. These bodies were then heat treated at 1250° C. in an oxygen atmosphere for 378 hours. The resulting bodies were examined and found to be single phase in that the $MgO.2FeO$ phase had disappeared and presumably had been completely reconstituted to $MgFe_2O_4$.

Other substantially identically composed bodies were pressed from the same ferrite powder but sintered by firing at 1450° C. in oxygen for 12 to 15 hours to form coherent bodies. These conventionally formed bodies were found to be composed of a single phase and to have the usual relatively high porosity within the ferrite grains.

The porosity, coercive force ($H_c$) and permeability ($\mu_{max}$) of the bodies prepared according to my invention are compared with the same properties of the substantially identical bodies prepared according to the conventional procedures in the following Table I.

Table I

|  | Average Properties | |
|---|---|---|
|  | Bodies sintered in reducing atmosphere and re-oxidized | Conventional Bodies sintered in oxidizing atmosphere |
| Porosity [1] | 0.6% by volume | 2.7% by volume. |
| $H_c$ | 1.3 oersteds | 1.9 oersteds. |
| $\mu_{max}$ [2] | 490 | 320. |

[1] Calculated from point counting data.
[2] Maximum direct current permeability.

From the foregoing table it will be apparent that the practice of my invention produces significant improvements in density and in the magnetic properties of these materials. Similar improvement in density of similarly treated bodies of other cubic ferrites may be obtained by this treatment. Specifically, the density of the ferrite was improved from about 97 percent of the theoretical density to more than 99 percent of theoretical density, the coercive force was reduced about 30 percent and the permeability was increased more than 50 percent, compared to substantially identical bodies produced by conventional techniques.

It should be understood that the firing temperature of this sintering treatment may be varied from about 1100° C. to about 1500° C., depending upon the particular cubic ferrite employed and that while the atmosphere used must be reducing with respect to the single phase ferrite under the firing conditions, atmospheres consisting of $CO+CO_2$, CO, commercial "cracked gas," water gas or mixtures of these gases, as well as many other reducing atmospheres known in the art may equally well be used. The second, oxidizing, heat treatment may be accomplished at temperatures ranging from about 900° C. to about 1500° C. depending upon the time, size of the body and the oxygen content in the atmosphere used. The atmosphere must, obviously, provide free oxygen for the reaction and may consist of atmospheric air, air enriched with oxygen, substantially pure oxygen or, in fact, any atmosphere which is oxidizing with respect to the reduced second phase at the firing temperature.

It is important to note that because the reducing treatment is accomplished during the sintering operation, the reduction is not merely accomplished at the surface of the body but extends throughout the interior as well. The reduction treatment is thought to involve the transformation of part of the single phase ferrite into a second phase having a lower state of oxidation. For example, the common ferrites previously mentioned are thought to be reduced from a single phase to form the two phase systems shown in Table II.

*Table II*

| Single Phase Ferrite | Two Phase System After Reduction |
|---|---|
| $MgFe_2O_4$ | $MgO \cdot 2FeO + MgFe_2O_4$ |
| $MnFe_2O_4$ | $MnO \cdot 2FeO + MnFe_2O_4$ |
| $ZnFe_2O_4$ | $ZnO \cdot 2FeO + ZnFe_2O_4$ |
| $CdFe_2O_4$ | $CdO \cdot 2FeO + CdFe_2O_4$ |
| $CuFe_2O_4$ | $CuO \cdot 2FeO + CuFe_2O_4$ |
| $NiFe_2O_4$ | $NiO \cdot 2FeO + NiFe_2O_4$ |
| $CoFe_2O_4$ | $CoO \cdot 2FeO + CoFe_2O_4$ |

As is well known, these single phase ferrites readily form single phase solid solutions with each other which respond to the reducing, sintering and subsequently oxidation treatments according to my invention.

From the foregoing it will be apparent that I have provided a method for substantially improving the quality of the cubic ferrite ceramics.

What I claim as new and desire to secure by Letters Patent of the United States is:

1. The method of producing a ferrimagnetic cubic ferrite ceramic body having density greater than 99% of theoretical density and having uniquely high permeability and low coercive force which comprises the steps of subjecting a dry magnesium ferrite powder to a pressure of about 5000 pounds per square inch pressure to produce a magnesium ferrite powder body of desired shape, subjecting the resulting pressed body to a temperature of about 1450° C. for from 12 to 15 hours under a carbon dioxide atmosphere and thereby forming a non-magnetic second phase solid solution consisting of MgO and FeO located principally at the grain boundaries and dispersed throughout the interior of the cubic ferrite body and thereafter heat treating the body at 1250° C. in an oxygen atmosphere for 378 hours to eliminate from the body all the second phase.

2. The method of producing a ferrimagnetic cubic ferrite ceramic body having a density greater than 99% of theoretical density and having uniquely high permeability and low coercive force which consists essentially at the steps of subjecting to pressure a dry powder of ferrimagnetic ferrite selected from the group consisting of $MgFe_2O_4$, $MnFe_2O_4$, $ZnFe_2O_4$, $CuFe_2O_4$, $NiFe_2O_4$, $CoFe_2O_4$ and solid solutions thereof and thereby forming a powder body of desired shape, sintering the resulting pressed body in a reducing atmosphere and thereby forming a non-magnetic second phase solid solution located principally at the grain boundaries and dispersed throughout the interior of the resulting ferrimagnetic cubic ferrite body, and thereafter heat treating the said resulting ferrimagnetic cubic ferrite body in an oxidizing atmosphere at from 900° to 1500° C. and thereby converting all the non-magnetic second phase component to the ferrimagnetic ferrite.

References Cited in the file of this patent

UNITED STATES PATENTS

| 2,535,025 | Albers-Schoenberg | Dec. 26, 1950 |
| 2,579,978 | Snoek et al. | Dec. 25, 1951 |
| 2,734,034 | Crowley | Feb. 7, 1956 |
| 2,736,708 | Crowley et al. | Feb. 28, 1956 |
| 2,754,172 | Went et al. | July 10, 1956 |
| 2,900,344 | Stuyts et al. | Aug. 18, 1959 |
| 2,958,664 | Vassiliev et al. | Nov. 1, 1960 |

OTHER REFERENCES

Fresh: Proceedings of the IRE, October 1956, pp. 1305, 1306.

Harvey et al.: RCA Reviews, September 1950, pp. 344–349.

J. Institute of Electrical Engineers, Japan, November 1937.

Fresh: Proceedings of the IRE, October 1956, vol. 44, No. 10, pp. 1303–1311.

Brailsford: Magnetic Materials, John Wiley & Sons, N.Y., 3rd ed., 1960, p. 162.

Hogan: Ferrites, Scientific American, June 1960, pp. 92–104.